BINARY MAGNETIC RECORDING SYSTEM

Filed Jan. 14, 1964 8 Sheets-Sheet 1

Nov. 21, 1967 M. AVRIL ET AL 3,354,446

BINARY MAGNETIC RECORDING SYSTEM

Filed Jan. 14, 1964 8 Sheets-Sheet 5

BINARY MAGNETIC RECORDING SYSTEM

Filed Jan. 14, 1964 8 Sheets-Sheet 6

United States Patent Office 3,354,446
Patented Nov. 21, 1967

3,354,446

BINARY MAGNETIC RECORDING SYSTEM

Michel Avril, Gif-sur-Yvette, Raymond Moreau, Yveline, and Alix Pages, Gif-sur-Yvette, France, assignors to Commissariat à l'Energie Atomique, Paris, France Filed Jan. 14, 1964, Ser. No. 337,686
Claims priority, application France, Jan. 15, 1963, 921,493
6 Claims. (Cl. 340—174.1)

ABSTRACT OF THE DISCLOSURE

A device for recording information on a magnetic support and for reading the information thus recorded, said recording being effected in pure binary code, which device comprises, in combination:

recording means comprising, for each binary order individually, a register unit B supplying two opposed signals, an "exclusive OR" unit C, a current generator H, and a phase modulation recording head J; and for all the binary orders collectively, a zero resetting pulse generator K, a pilot unit A delivering a pair of delayed opposed signals, a current generator M and a recording head N similar to J;

and reading means comprising, for each binary order individually, a reading head, a shaping unit AC, and a register unit AD; and for all the binary orders collectively, a pilot unit AL providing a delay, an "AND" circuit AM, AN, and a zero resetting generator AP.

The present invention relates to devices for recording information on a magnetic support and for reading the information thus recorded. It is more especially concerned with devices for recording information in pure binary code, of the parallel type, on a multitrack magnetic tape and for reading the information thus recorded on a magnetic tape.

The chief object of the present invention is to provide improvements in such devices concerning chiefly, on the one hand, safety (due to the method of recording and to the detection of errors) and fastness of recording and the fast recording and reading of information and, on the other hand, the reduced volume and cost of the recording and reading installation.

The invention consists chiefly in providing:

For recording, on the one hand, for every binary order, a register unit with an input receiving the successive binary units (or bits) of this order and two outputs supplying opposed signals, one of which represents the received bit and the other one the negation, or complement, of this bit, an "exclusive OR" unit consisting of two "AND" sub-units in parallel having their outputs connected with an "inclusive OR" sub-unit, a current generator started by the output of the "exclusive OR" unit, and a phase modulation information bit recording head, excited by the output of this generator and, on the other hand, for the whole of the information, a zero resetting pulse generator connected with every register unit for periodically resetting it to zero with a recurrence period equal to that of the information received, a pilot unit, started by said zero resetting pulses for delivering a pair of opposed signals with the same recurrence period but with a delay, shorter than the duration of this period, with respect to the zero resetting pulses, the first signal of every pair that corresponds to every zero resetting pulse attacking one of the two inputs of one of the "AND" sub-units of all the "exclusive OR" units, the other input of this sub-unit being attacked by the second signal from the register unit of the same order, whereas the second signal of every pair of signals delivered by the pilot unit attacks one of the two inputs of the other "AND" sub-unit of all the "exclusive OR" units, the other input of these "AND" units being attacked by the first signal of the register unit of the same order, a current generator started by one of the two output signals of the pilot unit and a phase modulation information bit recording head energized by the output of this generator.

For reading, on the one hand, for every binary order, a phase modulation recorded information bit reading head, a shaping unit deducing, from the bit that has been read or possibly from a recording check pulse, negative or positive shaped pulses, with registers for synchronizing the shaped pulses corresponding to the whole of an information in order to deliver a bit pulse usable for the corresponding binary order, and, on the other hand, for the whole of the information a phase modulation recorded reference bit reading head, a unit for shaping the read reference bits, this head and this unit being analogous to the corresponding head and unit for the information bits, a pilot unit for synchronizing the output of the information bits that have been read and a generator for resetting the registers to zero after delivery of the bits of the whole of an information.

The invention is more particularly concerned with its application to numerical machines for treating information of the multidimensional analyzer type, for instance of the type described in the patent application filed in the same name and on the same day that the present application for Improvements in Devices for Analyzing Physical Phenomenons and in Particular Nuclear Phenomenons.

Preferred embodiments of the present invention will be hereinafter described with reference to the appended drawings, merely given by way of example and in which.

Figure 1:
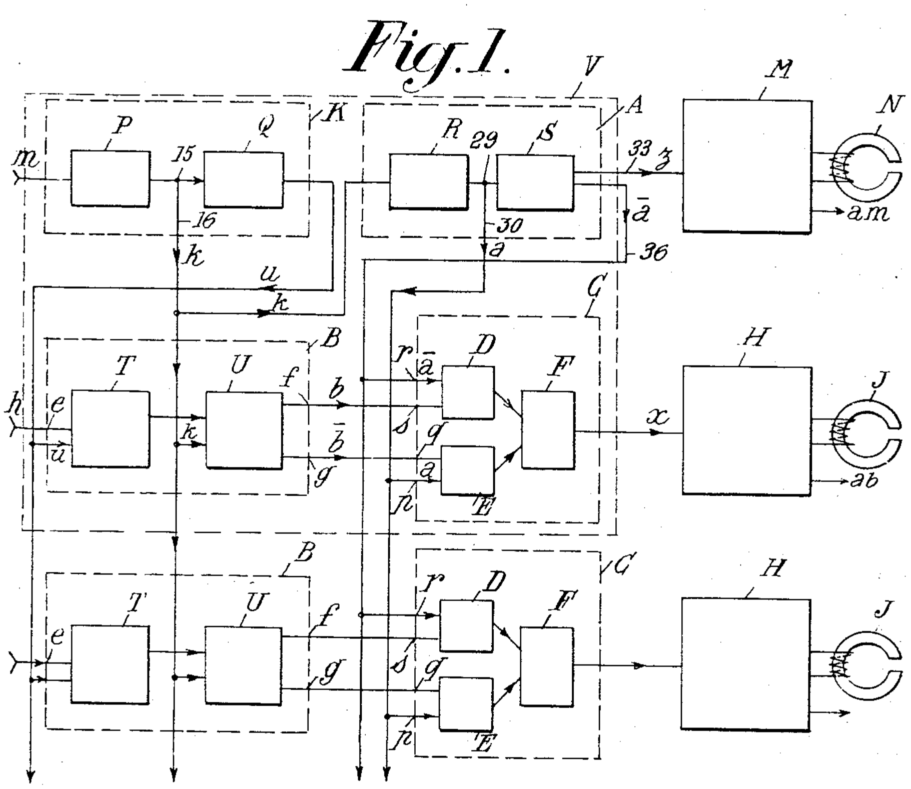
FIG. 1 is a diagrammatical view of a system for recording information in the binary form on a multitrack magnetic tape, according to the present invention.
Figure 2:
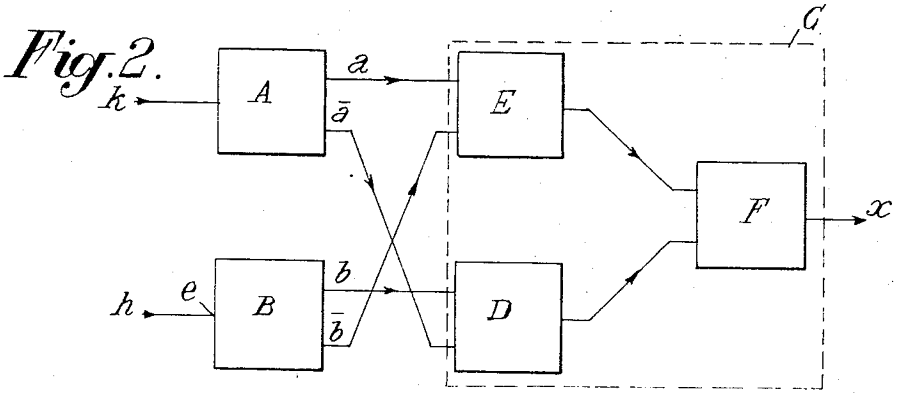
FIG. 2 is a diagrammatical view of the essential units of the system of FIG. 1.
Figure 7:
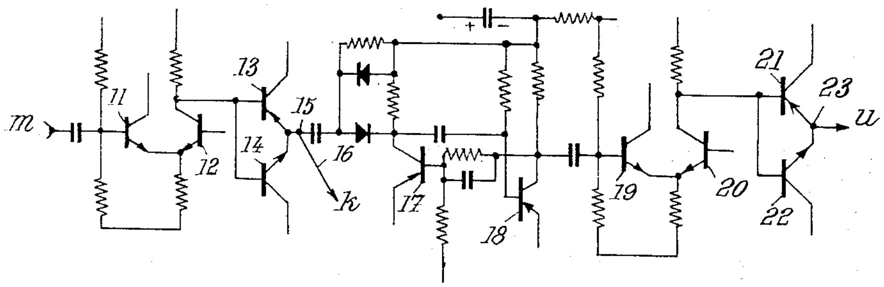
Figure 8:
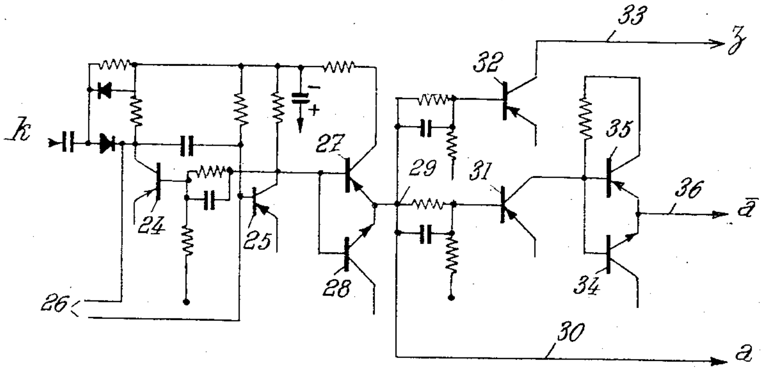
Figure 9:
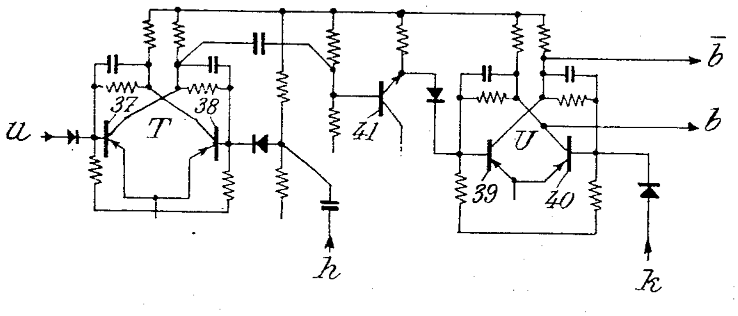
Figure 10:
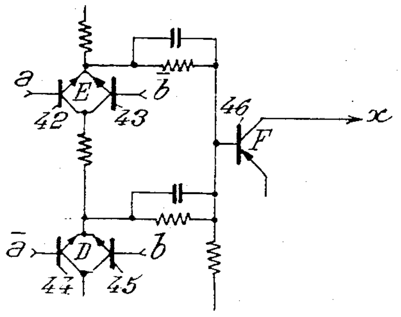
Figure 12:
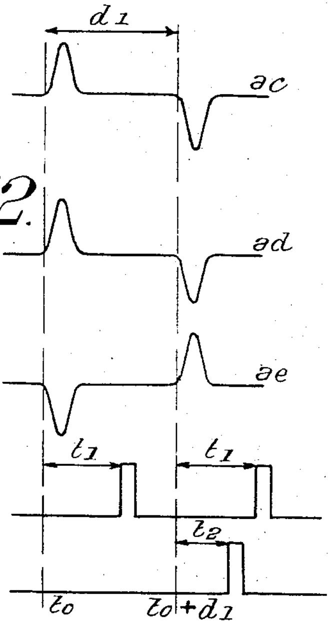
Figure 11:
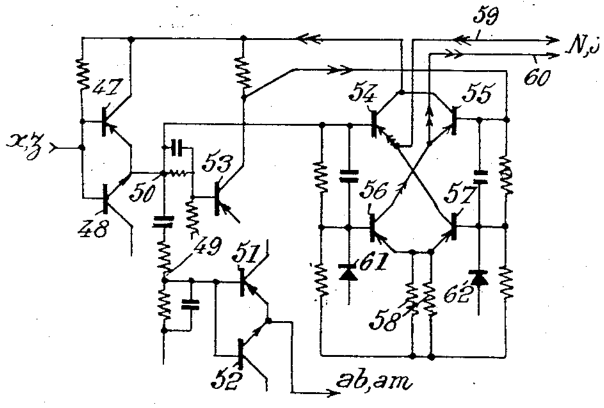
Figure 14:
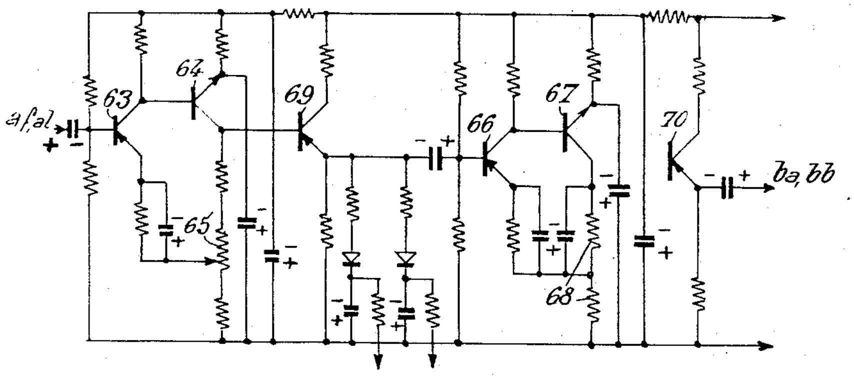
Figure 13:
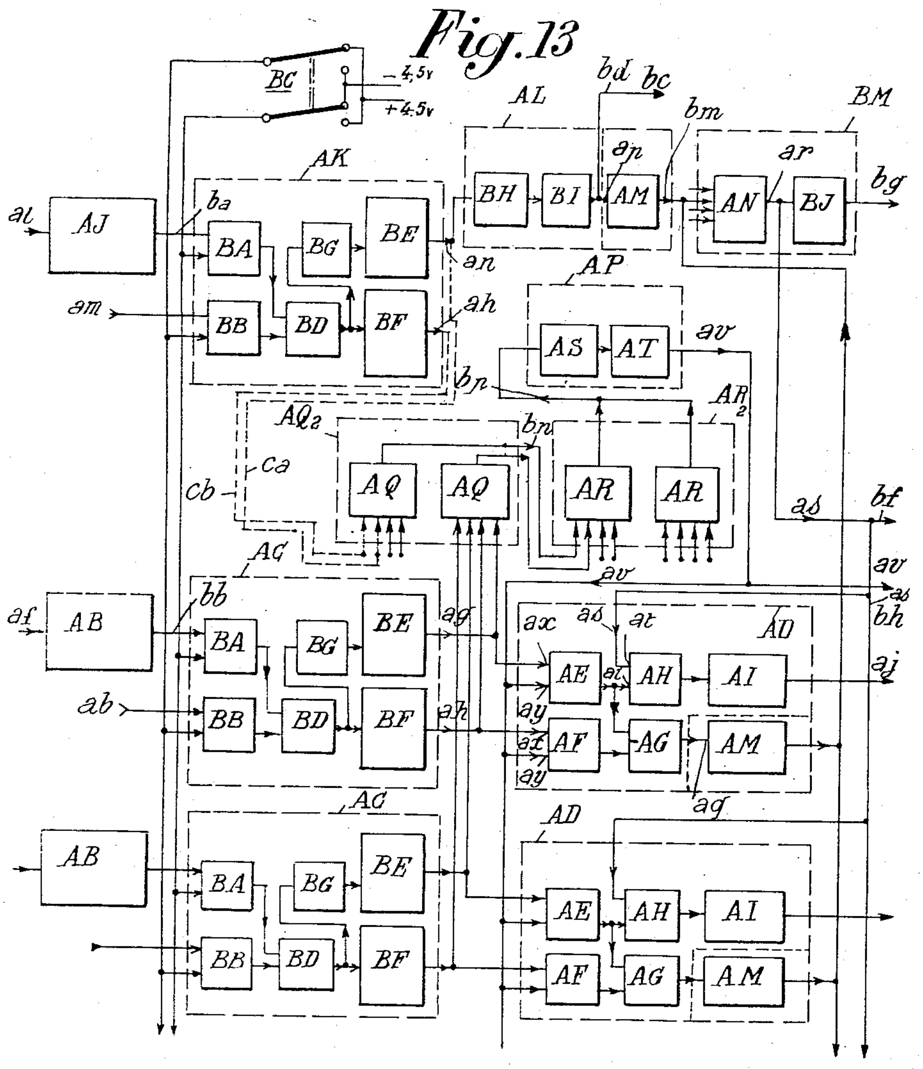
Figure 15:
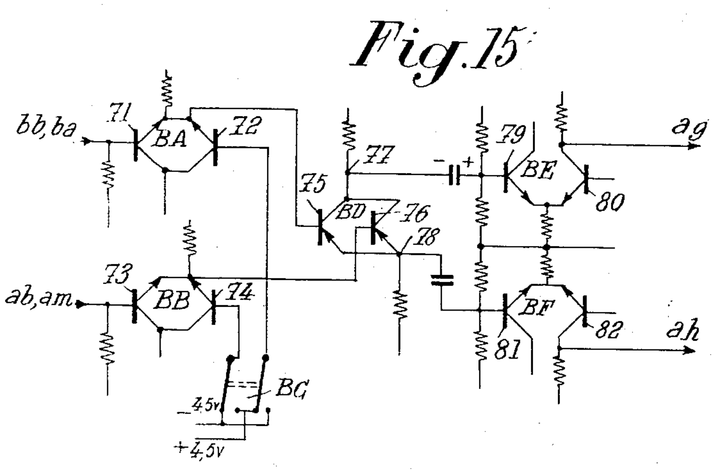
Figure 16:
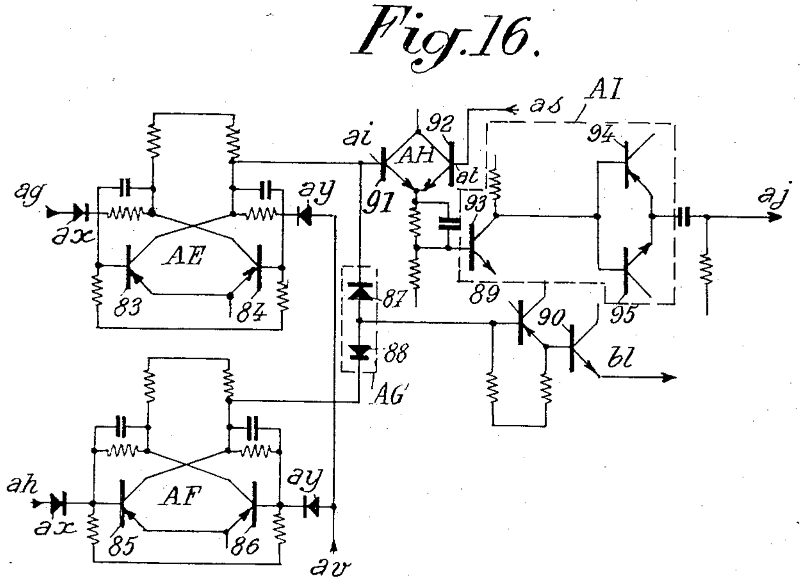
Figure 17:
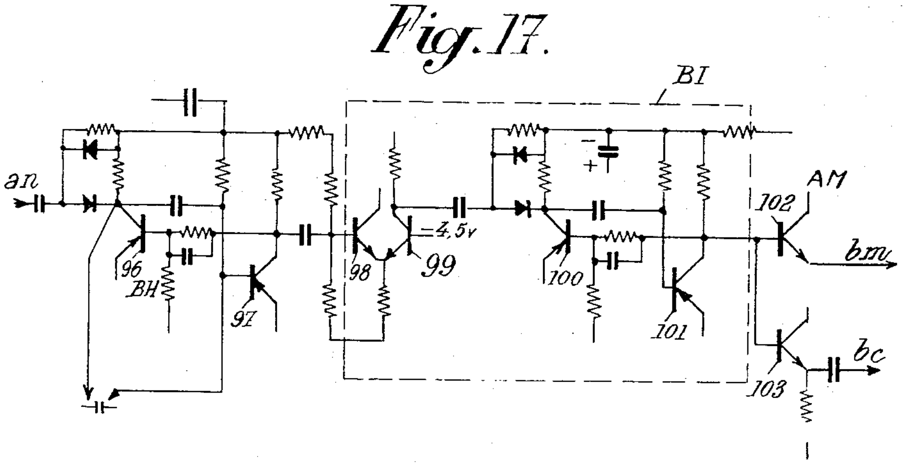
Figure 18:
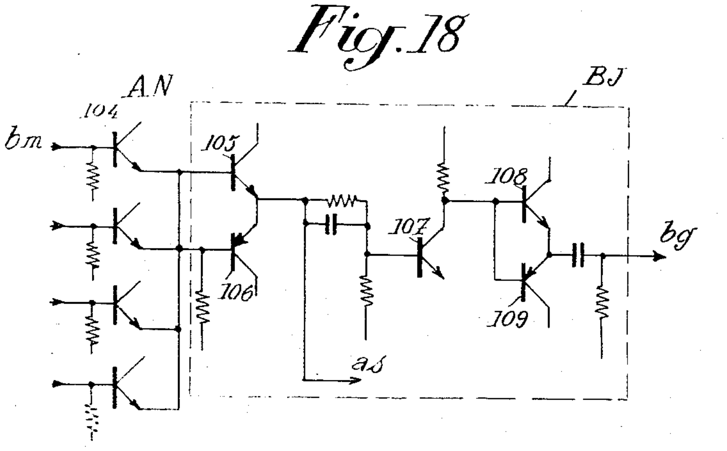
Figure 19:
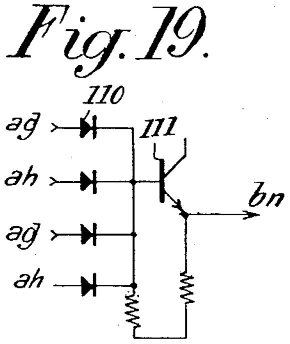
Figure 20:
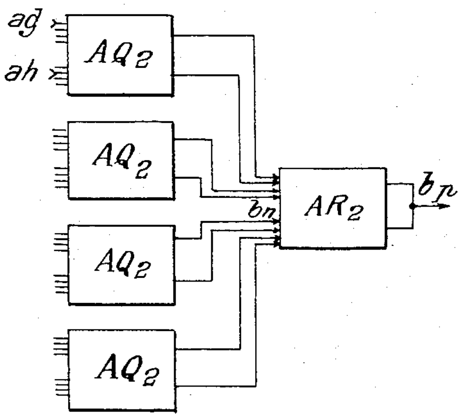
Figure 21:
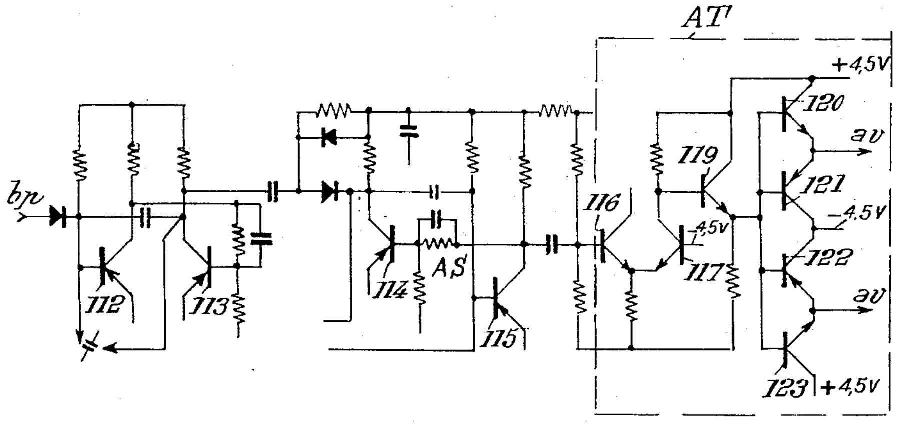
Figures 22, 23:
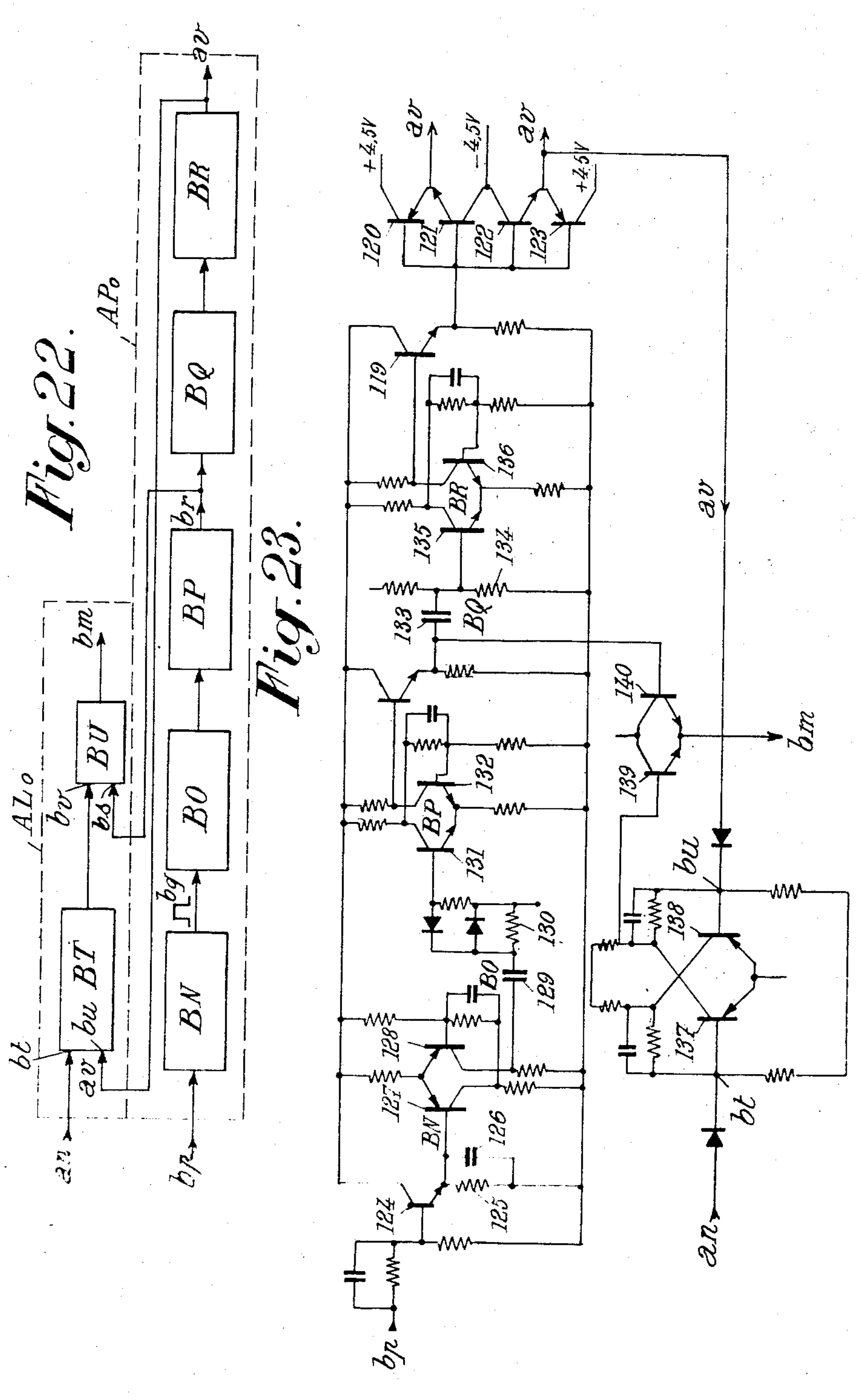

FIGS. 7 to 11 inclusive show a preferred embodiment of the respective units of the system of FIG. 2, to wit:

For FIG. 7 the unit or generator for resetting to zero;

For FIG. 8 the pilot unit;

For FIG. 9 one of the double registers;

For FIG. 10 one of the "exclusive OR" units;

For FIG. 11 one of the recording unit generators;

FIG. 12 shows the shapes and time relations of signals brought into play during the reading according to the present invention of the record obtained with the system of FIG. 1;

FIG. 13 diagrammatically shows a system for reading the information recorded by the system of FIG. 1;

FIGS. 14 to 21 inclusive show a particular embodiment of the respective units of the system according to FIG. 13, to wit:

For FIG. 14 one of the reading amplifiers;

For FIG 15 one of the units for shaping positive and negative pulses from the information that is read;

For FIGS. 16 one of the register units;

For FIG. 17 a pilot unit;

For FIGS. 18 to 20 regrouping units;

For FIG. 21 the zero resetting generator;

FIGS. 22 and 23 illustrate a modification of some units of the system according to FIG. 13.

We will now describe an information recording and reading device in pure binary code of the parallel type on a multitrack magnetic tape.

The recording of informations upon a magnetic support, in particular a magnetic tape, followed by the reading, when so desired, of the informations that have thus been recorded, is particularly interesting for storing informations in memory without modifying the time relation between said informations which is very important for studying time correlations between physical phenomenons, a study which at the present time is generally made by means of multidimensional analyzers which include at least one memory. This memory may for instance consist of a magnetic tape, on which the successive informations coded in digital or numeric form are recorded, and which preserves these informations with the time relation between them to permit a subsequent treatment during which the informations that they contain are extracted therefrom; a particularly interesting example of an analyzer to which such a magnetic memory may be applied is described in the above mentioned patent application.

The recording and reading device which will be hereinafter described makes use of a binary code that is to say of a code using only two digits "0" and "1," the first one being generally represented by the absence of a pulse and the second one by a pulse (they may sometimes be represented by two different voltage levels) and more especially a parallel binary code wherein every information element, represented by a given "binary number" comprising $n$ binary orders (that is to say a system of $n$ binary digits disposed in a given sequence, in depending upon the number of different informations to be coded), is transmitted simultaneously in parallel along $n$ channels. With such a parallel binary code the succession of informations to be recorded is in the form of a succession of binary numbers arriving with their $n$ digits, represented by pulses or voltage levels, in parallel along $n$ channels or conductors, to the $n$ inputs of the recording device which is to record them on the $n$ parallel tracks of a magnetic tape by means of $n$ recording heads suitably energized by the succession of pulses or voltage levels.

Among the various recording methods, the present device makes use of the phase modulation method according to which every binary digit, also called bit, is characterized by a shifting between two states of opposed saturation of an elementary zone of the magnetic tape (such a zone may, as a matter of fact, be in either of two different saturation induction states +BS or −BS). For instance, to bit 1 corresponds a shifting from state +BS to state −BS whereas to bit "0" corresponds the shifting of −BS to +BS; such a recording method has the advantage of clearly setting in evidence the difference between the accidental absence of a bit (no shifting) and the presence of bit "0" (shifting from −BS to +BS), which is not the case with the usual modulation method wherein bit "0" corresponds to the absence of modulation, and of reducing the errors produced by parasitic signals, because the sensitiveness of the tape is maximum in the state thereof where it is not initially magnetized, which state does not exist during recording by the phase modulation method, whereas in some other methods the tape is, during operation, in such a state where it is not magnetized.

The chief logical operations of the Boolean Algebra relative to bits will now be reminded, said operations being brought into play in the logical circuits of the present device.

The negation (or complementary) operation which causes to correspond to a bit the opposed bit (represented by the same letter but with a line traced above it) is carried out in a "NO" circuit with an input and an output, the latter delivering bit "1" if the input receives bit "0" and inversely. The intersection or coincidence operation (which corresponds to the simultaneous existence of two or more phenomenons) is carried out in a "AND" circuit with at least two inputs and one output which delivers bit "1" only if all the inputs simultaneously receive bit "1." The "inclusive OR" operation (generally called merely "OR") which corresponds to the existence of at least one of two or more phenomenons, is carried out in an "inclusive OR," or merely "OR" circuit or mixer with at least two inputs and one output which delivers bit "1" when at least one input receives bit "1." Finally the "inclusive OR" operation which corresponds to the existence of only one of the two phenomenons is carried out in an "exclusive OR" circuit with two inputs and one output, the latter delivering bit "1" when one output, and only one, receives bit "1."

If the "NO," "AND," and "inclusive OR" circuits are basic circuits well known to anyone skilled in the art and which may be made by means of relays, vacuum tubes, diodes, transistors or silicon controlled diodes (in the following detailed description, embodiments of these circuits making use of transistors will be disclosed), the "exclusive OR" circuit is a complex circuit which may consist for instance, as illustrated with reference to FIGS. 1 and 2 of two "AND" circuits in parallel each supplied with one of the bits to be treated and the complement or negation of the other bit, the outputs of said circuits being connected with an "inclusive OR" circuit the output of which constitutes the output of the "exclusive OR" circuit.

It is essentially by means of an "exclusive OR" circuit that, in a device according to the present invention, the phase modulation recording of every information bit is obtained as it will now be explained with reference to FIGS. 1 to 6. Besides, this device also permits the recording, for every information, of a reference pulse or bit, this supplementary pulse ensuring not only marking and synchronization of the successive information elements but also permitting of checking up, at the time of reading, the recording of the whole of the bits of every information.

Reference is first made to FIG. 1 which shows, in the form of blocks (the direction and circulation of the pulses or currents along the connection conductors being indicated by arrows), the recording system according to the invention. This figure illustrates only the recording of the bits of successive informations for two binary orders and of the reference pulses or bits, whereas actually there is provided a great number of binary orders, for instance fifteen, in the case of a magnetic tape having a width of 25 mm.

Such a recording system comprises:

On the one hand, for every binary element or information bit of a parallel code, that is to say for every binary order, a register unit B with an input $o$ receiving the information successive elementary bits, of a given binary order, to be recorded, and two outputs $f$ and $g$ delivering opposed signals $b$ and $\bar{b}$ (the first one, $b$, representing the bit $h$ which has been applied on the input after a resetting to zero of register unit B and the second one, $\bar{b}$, representing the negation or complement of this bit, an "exclusive OR" unit C consisting of two "AND" sub-units D, E in parallel having their outputs connected with an "inclusive OR" sub-unit, a current generator H started by the output signal $x$ of the "exclusive OR" unit C and a phase modulation information bit recording head J, energized by the output of this generator for inscribing on one of the tracks of the magnetic tape (not shown) circulating in front of it and of the other recording heads at a given speed, which may be adjustable, the recording of the coded information.

On the other hand, for the whole of the information, a generator K of zero resetting pulses $k$, connected with every register unit B for periodically resetting it to zero with a period of recurrence equal to that of the information to be recorded in response to reference pulses $m$ which are applied thereto, a pilot unit A started by said pulses $k$ for delivering a pair of opposed signals $a$, $\bar{a}$ with the same period of recurrence but with a delay, shorter than the duration of this period, with respect to the zero resetting pulses, the first signal $a$ of every pair corresponding to every zero resetting pulse $k$ attacking one of the two inputs (input $p$) of one of the "AND" sub-units (unit E) of all the "exclusive OR" units C, the other input $q$ of these sub-units being attacked by the second signal $\bar{b}$ of the register unit B of the same order, whereas the second signal $\bar{a}$ of every pair of signals delivered by the pilot unit A attacks one of the two inputs (input $r$) of the other "AND" sub-unit (unit D) of all the "exclusive OR" units C, the other input $s$ of these "AND" units being attacked by the first signal $b$ of the register unit B of the same order, a current generator M started by an output signal of pilot unit A, and a recording head N for the reference bits, energized by the output of this generator performing, like the phase modulation heads J, the recording of the reference pulses.

As a matter of fact, in the embodiment illustrated by the drawing:

Generator K comprises a threshold stage P normalizing the reference pulses for delivering calibrated zero resetting pulses $k$ and a delay unit Q introducing a delay $v$, very short with respect to the period of recurrence or repetition $w$ of the reference pulses, for instance a delay of two microseconds, for delivering calibrated zero resetting delayed pulses $u$.

Pilot unit A consists of a univibrator R (also called monostable multivibrator, the structure and operation of which will be hereinafter described with reference to FIGS. 7 and 8) having for its effect, in response to a pulse $k$ received by it, to deliver a signal or pulse $a$ during a well determined time $d$ substantially greater than $v$ but shorter than $w$ of a "NO" unit S which transforms $a$ into its complement $\bar{a}$.

And every register unit B comprises two successive elementary registers T and U, the first register T receiving, for every information, first the bit $h$ of its order then, after a time $v$, pulse $u$ which causes it to transfer bit $h$ (which it had stored during time $v$) toward the second register U which had previously been reset to zero by pulse $k$.

The recording device $v$ for a binary order, illustrated diagrammatically in FIG. 2 (wherein the same reference letters as in FIG. 1 have been used), therefore comprises:

A univibrator S with a reversing device S constituting the pilot unit A delivering, in response to a reference pulse $k$, signals and $\bar{a}$, $a$ representing "0" when this pulse takes place.

A register unit B delivering, in response to bit pulses $h$, signals $b$ and $\bar{b}$, $b$ representing "1" when the bit is "1."

And an "exclusive OR" unit C consisting of two "AND" units D, T, one of which receives $a$ and $\bar{b}$ and the other of which receives b and $\bar{a}$ from A and B, and of an "inclusive OR" unit F connected to the outputs of D and E.

The operation of a system V (FIGS. 1 and 2) is as follows, reference being made to the pulses and signals of FIGS. 3 and 5.

If an information, comprising fifteen binary digits or bits $h$ (fifteen binary orders) and accompanied by a reference pulse $m$ occurs at the input of system V at time $t$—

(a) At this time $t$:

The fifteen digits $h$ are placed in memory in the fifteen register T (only two of which have been shown, the tipping of a register T (consisting as it will be hereinafter indicated of a bistable multivibrator) takes place for a given order if the digit of this number is "1" whereas the register remains in its initial state (or zero state) if the corresponding digit is "0."

The normalized reference signal $k$ resets register U to zero and starts the delay unit Q and the univibrator E, which shifts from its stable state to its astable state.

(b) At time $t+v$:

Unit Q sends a delayed zero resetting pulse $u$ which resets the fifteen registers T to zero (so that they are made capable of receiving the digits of the next information); when a register T marks a digit "1," the zero resetting tipping transfers this digit into the register U corresponding thereto; digits $h$ are therefore transferred to registers U.

(c) At time $t+d$:

Univibrator R shifts and returns to its single stable state.

Figure 3:
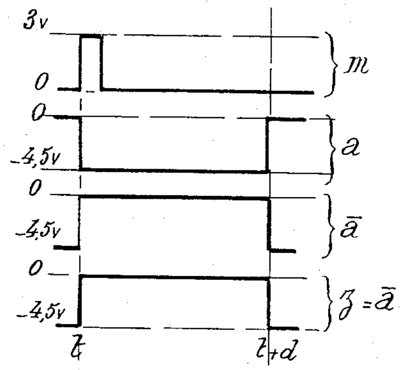
Figure 4:
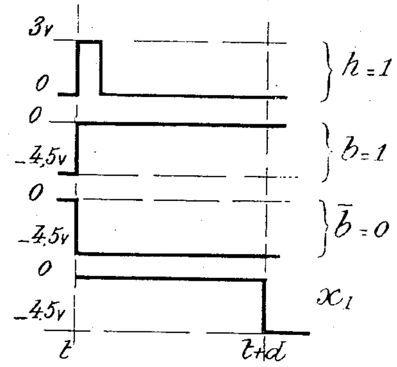
Figure 5:
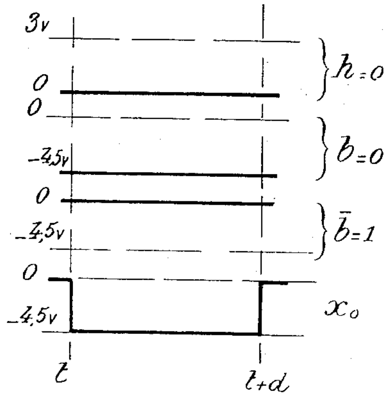

In FIGS. 3 to 5 (where the voltages in volts have been plotted in ordinates and the times in abscissas) we have respectively shown what takes place for a digit of an order equal to "0," neglecting $v$ with respect to $d$ ($t$ and $t+v$ are confounded). It is found that the signals of opposed polarities $a$ and $\bar{a}$ have a duration equal to $d$, whereas the signal of opposed polarities $b$ and $\bar{b}$, representing the digits to be recorded, have a longer duration, because $d$ (duration of signals $a$ and $\bar{a}$) is smaller than $w$ (duration of signals $b$ and $\bar{b}$).

Referring again to FIGS. 1 and 2, it will be seen that the "AND" units D and E work on the following schedule:

| | | |
|---|---|---|
| 1st case | a=0, therefore $\bar{a}$=1<br>b=0, therefore $\bar{b}$=1 | Circuits D and E do not deliver current. |
| 2nd case | a=1, therefore $\bar{a}$=0<br>b=0, therefore $\bar{b}$=1 | Circuit D delivers current. |
| 3rd case | a=0, therefore $\bar{a}$=1<br>b=1, therefore $\bar{b}$=0 | Circuit E delivers current. |
| 4th case | a=1, therefore $\bar{a}$=0<br>b=1, therefore $\bar{b}$=0 | Circuits D and E do not deliver current. |

Therefore the "inclusive OR" circuit F will not deliver current in the first and fourth cases but it will deliver current in the second and third cases. It will thus be seen that system C truly constitutes an "exclusive OR" circuit which delivers "1" only if one of the signals $a$ or $b$ represents a "1."

Referring now to FIGS. 3 to 5 it will be seen that the output signal $x$ of the "exclusive OR" circuit C depends upon the levels of $a$ and $b$ and that it undergoes level transitions in the reverse direction at time $t+d$ for $h=0$ and for $h=1$. As a matter of fact, if $h=1$ (FIG.1), $b=1$ and the corresponding signal $x$ indicated by $x_1$ passes from the higher level to the lower level at time $t+d$; on the contrary, if $h=0$ (FIG. 5), $b=0$ and the corresponding signal $x$, indicated by $x_0$, passes from the lower level to the higher level at time $t+d$.

Figure 6:
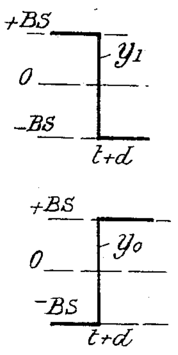
FIGS. 3, 4, 5 and 6 illustrate the shape and time relations of signals brought into play in the system of FIG. 1 and serving to explain the operation of this system with reference to FIG. 2.

When these opposed current transitions $x_1$ or $x_0$ are applied to a current generator H, the latter produces in the recording head associated therewith two opposed transitions of saturation inductions, to wit:

From +BS to −BS for a digit $h=1$
From −BS to +BS for a digit $h=0$ as illustrated by FIG. 6 where, the times being plotted in abscissas and the inductions in ordinates, we have shown the saturation induction transitions $y_1$ and $y_0$ corresponding to transitions $x_1$ and $x_0$ respectively.

Finally, in FIG. 3, we have also shown signal $z$, applied to current generator M and which is analogous to $\bar{a}$. This signal $z$ always undergoes the same transition at time $t+d$ and permits of recording a reference signal corresponding to the transitions $y_1$ of FIG. 6 representing digit "1."

A detailed embodiment of the respective units of the recording system of FIG. 1 is now given by way of example (FIGS. 7 to 11). It will be noted that all the units of this system, same as all of the reading system associated therewith are of the type making use of semi-conductors and actually include only transistors, solid diodes, resistors and capacitors which ensures a great resistance reduced weight and a long duration and also a reduced consumption of current and an easy mounting on printed circuits which can be easily assembled together and replaced if necessary.

The first of the units, all of which may be advantageously made in the form of printed circuits, consists of the zero resetting generator K of FIG. 1, which is shown in detailed manner in FIG. 7. This unit comprises:

A differential stage with a threshold of +3 volts, consisting of two NPN transistors 11 and 12, which receive the successive reference signals *n* in order to select these signals the amplitude of which average 7 volts in the presence of background noise of an amplitude lower than 3 volts.

A double emitter-follower, with transistors 13 and 14 which transforms the selected reference signals *m* into signals *k* under very low impedance available at 15, signals *k* (FIG. 1) performing through conductor 16 the resetting to zero of the fifteen registers U and the attack of the pilot unit A.

A univibrator or monostable multivibrator consisting of two PNP transistors 17 and 18, this univibrator, which is normally in its only stable position, being shifted to its astable or unstable position by the signals *k* available at 15 and remaining in this astable state for a duration *v* (equal for instance to two microseconds) determined by the values of the elements of this univibrator, then returning to its stable state.

A differential stage with a threshold analogous to stage 11–12, and consisting of two NPN transistors 19–20, receiving the wave front returning from univibrator 17–18 so as to normalize the level thereof.

Finally a second double emitter-follower 21–22 analogous to the double emitter-follower 13–14, stage 21–22 having for its effect to deliver at 23, under low impedance, the delayed signal *u* for resetting to zero.

In FIG. 8 we have shown a detailed construction of the pilot unit A of FIG. 1. The latter includes, in this construction:

A univibrator 24–25 analogous to the univibrator 17–18 of FIG. 7 but introducing a much more important delay *d*, this delay corresponding to the time for which the univibrator remains in its astable state after tipping under the effect of the successive pulses or signals *k* that it receives from the point 15 of the zero resetting generator of FIG. 7. Advantageously univibrator 24–25 may be adjustable from the outside in accordance with the speed of unwinding of the magnetic tape, for instance through conductors 26.

A double emitter-follower 27–28 analogous to the stages 13–14 and 21–22 of FIG. 7, delivering, under a low impedance, signals *a* available at point 29, these signals *a* being sent such as they are through conductor 30 to the "AND" circuits E (FIG. 1).

Two reversing circuits or "NO" circuits, each consisting of a PNP transistor 31 or 32 (which is conductive when $a=1$) which reverse the polarity of the signals that are applied thereto; whereas transistor 32 delivers directly, through conductor 33, pulses *z* toward current generator M (FIG. 1), the signal delivered by transistor 31 are sent to a double emitter-follower 34–35 which delivers, through conductor 36, signal $\bar{a}$ which are sent to the "AND" circuits D (FIG. 1) under low impedance.

Each of the register units B of FIG. 1 may be made, as shown by FIG. 9, by means of two bistable multivibrators (each formed by two PNP transistors 37–38 on the one hand and 39–40 on the other hand connected together through the emitters) constituting the two registers T, U connected together through an emitter-follower stage 41. Multivibrator T comprising transistors 37–38 is reset to zero by the delayed pulses *u*. This bistable multivibrator remains in this initial stable state until a digit *h* is applied. If this digit is "0," the multivibrator remains in said stable state but, if the digit is "1," the multivibrator shifts into its second "astable" state. The next delayed pulse *u* will cause a digit "1" to be transferred to the next bistable multivibrator 39–40 constituting register U through emitter-follower 41. At the end of the operation, the resetting pulses *k* reset bistable multivibrator 39–40 into its initial state of rest. The two collectors of the bistable multivibrator 39–40 deliver signals $\bar{b}$ and *b*, respectively, which are applied, the first one to the "AND" circuit E and the second to the "AND" circuit D. It will be noted that every input of register T comprises its own +3 volts (+25%) threshold circuit.

Every "exclusive OR" system C comprises, as above indicated, two "AND" circuits in parallel D, E having their outputs connected with an "OR" circuit F (FIGS. 1 and 2). In an embodiment illustrated by FIG. 10, each of the "AND" circuits D, E consists of two NPN transistors 42–43, 44–45, respectively, mounted and connected in parallel, the state which represents digit "1" on the inputs of these transistors corresponding to the blocking of the preceding circuits. As for the "OR" circuit F, it consists of the PNP transistor 46 which also performs the adaptation of impedance toward the current generator H receiving the signals *x* delivered by transistor 46.

The last particular unit of the system of FIG. 1 consists of the current generator H or M illustrated by FIG. 11. The input of the circuit of FIG. 11 receives a signal *x* or a signal *z* according as the unit is a unit H or a unit M, respectively, from the collector of the PNP transistor (respectively 46, FIG. 10, or 32, FIG. 8). The current generator illustrated by FIG. 11 comprises:

A first double emitter-follower with transistors 47 and 48.

A differentiating circuit 49 with capacitors and resistors, differentiating a portion of the current supplied by the double emitter-follower 47–48 available at 50.

A second double emitter-follower 51–52 delivering under low impedance the differentiated signal to form recording control signals *ab*, for a unit H, or *am*, for a unit M, these signals being intended to be used directly in the reading system illustrated by FIG. 13.

A reversing transistor 53, coupled at point 50, and a reversing switch, consisting of four transistors 54, 55, 56, 57, which works as follows: If the transistor which delivers signals *x* or *z* is not conductive, transistors 56 and 54 are conductive and the current defined by the voltage across the terminals of resistors 58 in parallel passes through the recording coil coupled with conductors 59–60 in a first direction represented by the double arrows traced on the conductors of the circuit; if, on the contrary, the transistor *x* or *z* that delivers current is conductive, transistors 55 and 57 are conductive and the current passes through the recording coil in the opposed direction (it flows through the conductors in the direction opposed to that illustrated by the double arrows); for both directions of the current, the intensity of this current is the same, since the voltage across resistors 58, defined by diodes 61 and 62, is constant; therefore, it suffices to choose resistors 58 to obtain that the intensity of the current flowing through the coil of the recording head N or J saturates the magnetic tape.

It will be noted that this arrangement is more advantageous than a constant voltage system which would lead to a higher time constant, because for every transition, the self-inductance of the recording coil of head N or J opposes this transition.

On the other hand, the differentiated signal *ab* or *am* permits of directly controlling the recording by means of the reading system which will now be described and to which the signal ab or *am* is applied, which is very advantageous when working at very slow speeds for which a checking by reading is impossible.

Up to now, we have described in detail, with reference to FIGS. 1 to 11, a recording system according to the invention.

We will now describe, with reference to FIGS. 12 to 23, a system for reducing the magnetic recording thus obtained.

Before specifically describing the means used for this reading, we will indicate, with reference to FIG. 12, the method of reading the recording.

The signals marked on the magnetic tape, as above indicated, are read by means of reading heads (not shown) which perform the differentiating of the signals, these heads being responsive only to transitions from a saturation induction state to the opposed saturation induction state.

We provide a reading head for every recording track, for instance a reading head for every bit in every information and a supplementary reading head for the reference digits.

The differentiated signals issuing from the reading heads are respectively (FIG. 12): *ac* for the reference digit (a positive pulse followed by a negative pulse), *ad* for an information bit equal to "1" (a positive pulse followed by a negative pulse as in the case of signal *ac*), finally *ae* for an information bit equal to "0" (a negative pulse followed by a positive pulse). Consequently, it will be seen that all the digits or bits, wether they are reference bits or information bits, comprise two pulses of opposed respective polarities separated by an interval $d_1$ (which is equal to $d$ if recording and reading are made with a same speed of displacement of the tape). All the pulses, whatever be their sign, are set in memory in registers which are therefore to be reset to "0" after a predetermined time $t_1$.

On the other hand, the negative pulse of the reference signal *ac* sets a delay $t_2$ at the end of which the information gets out, this order taking place only if the information is complete. As a matter of fact, $t_1$ is substantially equal to $d_1$ ($d_1$, when it is equal to $d$, being defined for recording as the minimum duration between two transitions). As for $t_2$, it is determined by the condition that the order of issue is delivered only when the registers for the fifteen channels in parallel have been filled. It will be seen that, for practical purposes, $t_2$ is a little smaller than $t_1$.

The reading system which will now be examined must make it possible:

To translate the phase modulation performed during the recording into standard signals or pulses representing the information in pure parallel binary code.

To detect possible errors, this being facilitated by the fact that the phase modulation differentiates in a clear manner the recording of bit "0" from the absence of recording and that the phase modulation method is little sensitive to parasites.

To transmit only non-erroneous informations, in standard language.

To define if possible the ratio of the effective informations to the erroneous informations.

Reference being made now to FIG. 13, which illustrates in the form of blocks the reading system, with the exception of the reading heads, which are of known type, a reading system according to the present invention comprises, in an embodiment given by way of example, the following elements:

For every information bit, that is to say for every binary order, a reading head (not shown) for reading a phase modulation recording, effecting upon reading differentiation of the bit signals that have been previously recorded, preferably a reading amplifier AB, amplifying the output *af* (of the *ad* or *al* type, FIG. 12) of every reading head, a shaping unit AC deducing from the bit that has been read or possibly from a recording check pulse *ab*, negative and positive shaped pulses *ag, ah*, respectively, generally a register unit AD consisting of a first and a second resistor AE and AF receiving respectively, on one of their inputs *ax* the negative pulses *ag* and the positive pulses *ah*, respectively, of the shaping unit AC, of an "inclusive OR" circuit AG mixing the outputs of the first and second registers AE, AF, of an "AND" circuit AH, one input *ai* of which is connected with the output of the first register, and of a reversing circuit AI reversing the output of said "AND" circuit AH to deliver the bit pulse *aj* usable for the corresponding order.

And for the whole of the information, a reading head (not shown) performing the differentiation of the previously recorded reference bits, preferably an amplifier AJ for reading the read and differentiated reference signals *al* (of the *ac* type, FIG. 12) and a shaping unit AK for the reference bits, receiving also the record checking reference signals *am*, this head, this amplifier and this unit being analogous to the corresponding head, amplifier and unit for the information bits, a pilot unit AL applying a first delay $t_2$ (shorter than one half of the duration of the period of recurrence $d_1$ of the informations that are read) to the negative pulses *am* produced in this shaping unit, an "AND" circuit (comprising subcircuits AM, AN in series) the inputs of which receive, one (input *ap*), the output of the pilot unit and each of the others (inputs *aq*) the output of the "inclusive OR" circuit AG of the register unit AD of an order and the output *ar* of which delivers a control pulse as applied on the other input of the "AND" circuit AH of all the register units AD, and a generator AP for resetting to zero the register units AD controlled by an "inclusive OR" unit (with sub-units AQ, AR in series) fed with the shaped positive and negative pulses *ah* and *ag* issuing from every shaping unit AC, and constituted by a delay unit AS introducing a second delay $t_1$ of the order of one half of the recurrence period $d_1$ of the informations that have been read and by a reversing device AT reversing the output of the delay unit AS and applying the reversed pulse *av* on the other input *ay* of the two registers AE, AF of every register unit AD for resetting them to zero.

To be more accurate, every shaping unit AC, AK comprises two "gates" BA, BB receiving, respectively, the signals *ba, bb* from the reference amplifier AJ, AB, and the reference signals *am, ab*, for controlling the recording, on their signal input, whereas a two positions switch device BC permits of opening either the whole of gates BA, or the whole of gates BB (for instance, in the upper position of switch BC, gates BB which receive the control signals *am* or *ab* are opened, whereas in the lower position of switch BC, the signals *ba* or *bb* coming from signals *al* or *af* respectively are transmitted through gates BA).

The outputs of the two gates BA and BB (which are not effective at the same time) are mixed in a mixer or "inclusive OR" circuit BD, the output of which is in turn connected to two shaping stages BE and BF to wit in the first one (BE) through the "NO" circuit BG and into the second one (BF) directly. In this way, we obtain the shaped negative signals *an* or *ag* respectively from BE and the shaped negative signals *ah* from unit BF.

Signals *an* are applied to pilot unit AL, which comprises successively a delay unit BH, consisting of a univibrator introducing a delay $t_2$, a stage BI for shaping the output of the univibrator delivering calibrated pulses *be* for controlling the piloting, which are transmitted through conductor *bd* and are also applied to the input *ap* of the "AND" circuit AM, and finally this circuit AM common to the reference digit and to three information digits.

Finally, to end the description of FIG. 13, it will be noted that the pulses *as* which issue from the "AND" circuits AN (receiving the outputs of the "AND" circuits AM) and which constitute the orders for extraction of the information applied to the inputs *at* of the "AND" circuits AH are also:

Collected by conductor *bf* to represent the number of the effective informations that have been delivered.

Reversed and shaped in the reversing and shaping unit BJ, which delivers the reference output pulses *bg*.

A last output is concerned with the receiving pulses sent through generator AP, these pulses *av*, which pass out through conductor *bh*, representing twice the number of total informations (because the resetting to zero generator AP is operated both by the negative pulses *ag* and by the positive pulses *ah* of the shaping circuits BE and BF respectively, that is to say twice for every information received from amplifiers AB, AJ or for every controlled pulse *ab*, *am*) which may be compared to the number of effective informations represented by the pulses as issuing through *bf*, to determine the ratio of the effective informations to the erroneous informations.

We will now describe, with reference to FIGS. 14 to 21, a detailed embodiment, given by way of example, of the respective units and circuits of the reading system shown by FIG. 13.

Referring first to FIG. 14, which illustrates a reading amplifier AB or AJ receiving the signals *af* or *al*, respectively, which are to be amplified to a level such that they can be used in subsequent logical circuits (FIGS. 15 to 21), it will be seen that this amplifier comprises a first amplification loop with two transistors, a PNP transistor 63 and an NPN transistor 64 with a very high rate of negative feed-back through a potentiometer 65 which permits of adjusting the gain of this first loop, for instance from 25 to 115. The potentiometers 65 of the respective amplifiers permit of balancing the output levels of the signals *bb* and *ba* of the respective amplifiers despite unequalities of the input signals *af*, *al*, due to the fact that the respective reading heads are not quite identical. This first loop 63, 64, 65 is followed by a second analogous loop 66, 67, 68 the input of which is connected to the output of the first loop through a transistor 69 mounted as an emitter-follower reestablishing the polarity of the signal. It will be noted that the gain of the second loop is defined by the ratio of resistors 68 and that it is fixed.

The polarity of the signals is again re-established after the output from the second amplification loop, which also has a very high negative feed-back rate, through a PNP transistor 70 mounted, like transistor 69, as an emitter-follower. We thus finally obtain the amplified signals *ba* or *bb*, the total gain of the two loops being not very high due to the very high negative feed-back rate. On the contrary, this high negative feed-back rate gives the amplifiers of FIG. 14 a very wide band, which permits of amplifying the signals without too much distortion. The output level for signals *ba*, *bb* is ± 3 volts, and the external control common to the sixteen channels (one reference channel and fifteen binary order channels) making is possible to adapt the gain to the different rates of movement of the magnetic tape that can be used for reading.

Signals *ba* and *bb* are then applied to a shaping unit, respectively AK or AC, of the type illustrated in detailed fashion by FIG. 15, which also receives record checking signals *am* or *ab* respectively.

Every unit AK or AC comprises two gates BA, BB, each consisting of a threshold differential stage with two NPN transistors 71, 72 on the one hand, 73, 74 on the other hand, the two transistors of every pair having their collectors connected together.

The selection control is effected by means of switch BC which permits of opening at will either gate BA or gate BB while closing the other gate (the term "open gate" means a gate which lets the signal or pulses received pass, whereas a "close gate" does not permit the pulses to pass, this definition being the contrary of that adopted for usual switches). Consequently, switch BC permits of applying at will either the signals read by the magnetic heads to the basis of a PNP transistor 75 or the record checking signals to the basis of a PNP transistor 76, the whole of the two transistors 75, 76 mounted in parallel forming the "OR" circuit BD, the common outputs 77, 78 of which consist, according to the position of switch BC, either of the signals that are read or of the record checking signals. As a matter of fact, we have provided two outputs 77 and 78, one for the negative pulses and the other for the positive pulses so as to include the reversing circuit BG into system 75–76.

Two threshold differential circuits BE and BF, each consisting of two NPN transistors 79, 80 on the one hand and 81, 82 on the other hand, shape the pulses available at outputs 77 and 78 for delivering the negative signals *ag* and the positive signals *ah*.

We will now describe a preferred embodiment of every register unit AD with reference to FIG. 16. Such a unit comprises two registers AE and AF (each consisting of a bistable univibrator with two transistors 83, 84 and 85, 86) receiving, on their first input *ax*, the control positive pulses *ag* and *ah*. These pulses, which correspond respectively to a negative signal and a positive signal, come from the corresponding unit AC. Resetting to zero, that is to say to the initial state, of the two bistable univibrators of every unit AD is effected by zero resetting pulses *av* which are applied to the second input *ay* of every univibrator. Therefore, the bistable univibrators, having been reset to zero by *av*, receive pulses *ag* or *ah*, representing digit "1" or digit "0." The bistable univibrator (or univibrators) for which digit "1" is received is (or are) caused to tip. The next resetting to zero by a pulse *av* resets all the bistable univibrators into the initial state while transferring digit "1" from the univibrators that had stored such a digit. On the contrary, no transfer is effected for the bistable univibrator or univibrators where a digit "0" has been stored.

The outputs of the two registers are mixed together in an "OR" circuit AG consisting of two diodes 87, 88. The output of the "OR" circuit is connected through a transistor 81 mounted as an emitter-follower, to the base of a transistor 90 belonging to an "AND" circuit AM common to either four register units AD or three register units AD and a pilot unit AL (the system illustrated by FIG. 13 comprising four "AND" circuits AM for the fifteen units AD and unit AL). We thus obtain signals *bl*.

The output of register AE is also applied to one of the inputs *ai* of an "AND" circuit AH with two NPN transistors 91, 92, the other input *at* of which receives extraction order pulses *as*. The output of the "AND" circuit AH is reversed by a NPN transistor 93 (the arrangement 91, 92, 93 being analogous to the corresponding arrangement 42, 43, 46 of FIG. 10).

Finally, a double emitter-follower stage with transistors 94, 95 permits of obtaining signals *aj* under low impedance. These signals or pulses *aj* represent, in the standard form, the digits that have been recorded on the record checking digits.

FIG. 17 illustrates a preferred embodiment of the pilot unit AL of FIG. 13. This unit, which receives the pulses *an* from shaping unit AK, comprises a first univibrator with transistors 96, 97 introducing a delay $t_2$, the edge of the signal corresponding to the resetting of this univibrator energizing, through a differential circuit having a threshold of −4.5 volts and including two transistors 98, 99, a second univibrator with transistors 100, 101 introducing a very small delay, of the order of 1 microsecond.

The output of the second univibrator is applied on the one hand to the base of a transistor 102 which constitutes, with three other analogous transistors, an "AND" unit AM delivering pulses *bm* when its three inputs are fed with current and on the other hand to a transistor 103 mounted as an emitter-follower to deliver under low impedance the signals *bc* for checking the piloting.

There are four "AND" circuits AM, each with four transistors 102. The outputs of the four "AND" circuits AM are grouped by means of another "AND" circuit AN also including four transistors 104, the bases of which receive the signals *bm* which flow out from the four "AND" circuits AM. This arrangement of the "AND" circuits is illustrated by FIG. 18 which represents the BM unit of FIG. 13. The output of circuit AN including four transistors 104 is applied to a double emitter-follower, with two transistors 105, 106, respectively a NPN one and a PNP one, the output of which emitter-follower is connected to a transistor 107 for reversing the signal.

A further double emitter-follower stage, with transistors 108, 109, the input of which is connected to the output of transistor 107, finally delivers the signals *bg* which constitute the reference output.

It will be noted that transmission of the information through the whole of the "AND" circuits AM and AN only takes place after a duration $t_2$ (delay introduced by univibrator 96, 97) after the negative pulse *an*, the duration of the output information being 1 microsecond (duration of the delay introduced by univibrator 100, 101). The different pulses which define the information, that is to say the pulses for the different orders, are simultaneous because the output as of the whole of the "AND" circuits AM, AN controls the simultaneous extraction of the information in the "AND" circuits AH which deliver, through the reversing and shaping circuits AI, the output pulses *aj* simultaneous for every information.

On the other hand, it will be noted that the "AND" circuits AM and AN have for their effect to check up whether there truly exists an information digit ("0" or "1") inscribed on every track at a level of a reference signal; as a matter of fact, it is only such a simultaneity which produces an output signal *as*, from these "AND" circuits AM and AN, capable of producing the extraction of the information from the "AND" circuits AH.

Such a checking of correct recording would not have been possible if one of the digits, for instance digit "0," had been inscribed on the magnetic tape in the same manner as the absence of a digit (for instance by leaving the tape in its initial non-magnetic state).

As the resetting to zero of registers AE and AF must take place with a delay $t_1$ with respect to every group of pulses, even if one or several digits of an information are missing, we provide a system of "OR" circuits AQ and AR and a resetting to zero generator AP which are illustrated in detailed fashion in FIGS. 19 to 21.

In FIG. 19, we have illustrated an "OR" circuit or elementary mixer AQ with four inputs, two of which receive pulses *ag* from circuits BE and two of which receive pulses *ah* from circuits BF. A mixer AQ consists of four diodes 110, this mixer delivering current, when one of its inputs is fed with current, into the base of a transistor 111 which reverses the pulses and delivers pulses *bn*. These last mentioned pulses are grouped in "OR" circuits or mixers AR analogous to the "OR" circuits AQ of FIG. 19.

In FIG. 20, we have shown the grouping of the whole of the "OR" circuits AQ and AR. Circuits AQ, same as circuits AR, are grouped two by two in the form of printed circuits. Every printed circuit comprises two elementary "OR" circuits of the type illustrated by FIG. 19 and there are therefore four printed circuits $AQ_2$ each comprising two circuits AQ of the type illustrated by FIG. 19 and two circuits $AR_2$ constituted by elementary circuits AR also of the type illustrated by FIG. 19. The incoming signals *ag* and *ah* are grouped in circuits $AQ_2$ and the outputs *bn* of circuits $AQ_2$ are grouped in two "OR" circuits of system $AR_2$, finally giving signals *bp*. A signal *bp* therefore appears every time there is at least one signal *ag* or *ah*, that it to say even if a portion of the information is missing. Thus, we are sure that resetting to zero occurs after every information, even if it is incomplete.

It will be noted that two of the incoming signals of the "OR" circuits AQ consist of the output signals *an* and *ah* from unit AK arriving through conductors *ca* and *cb* shown in dotted lines in FIG. 13. In a modification, these conductors *ca* and *cb* might be cancelled.

Signals *bp* issuing from the whole of the "OR" circuits are sent to the zero resetting generator AP illustrated by FIG. 21. This generator comprises a first univibrator, with two transistors 112, 113, which regroups signals *bp*. A second univibrator (constituting the delay unit AS) with two transistors 114, 115, defines times $t_1$, the rear edge of the signal corresponding to the resetting of univibrator 114, 115 being shaped by a threshold differential circuit constituted by two transistors 116, 117. This shaped rear edge serves to reset all the registers to zero through two emitter-followers (including transistors 120, 121 on the one hand and 122, 123 on the other hand) delivering signals *av* (the two outputs of the unit of FIG. 21 being combined together in FIG. 13).

As it will be seen, the reading system which has just been described has for its effect to extract an information only if it includes no error. The rate of error is easily determined because, as above indicated, we obtain on an output *bf* a pulse as for every correct information that is read and on an output *bh* two pulses *av* for every information, including erroneous ones, that is read. The number of erroneous informations which have been eliminated is easily deduced therefore.

The whole of the recording and reading device described by the drawings (with the exception of FIGS. 22 and 23) comprises (with the exception of the electronic means of the magnetic tape unwinding servo-mechanism and of the transistor stabilized feeding means) 780 transistors, 265 diodes, 1465 resistors and 511 capacitors, these components, which are very reliable, being mounted on 104 printed circuits.

In the embodiment of the reading system described with reference to FIGS. 13 to 21, as the signals for ordering the transfer of the information digits and for resetting to zero the registers AE and AF have different references for the origin of times, overlapping between these signals would risk to take place for informations repeated in quick succession.

This is why, when it is desired to provide devices permitting high speed recording and/or reading, it is advantageous to modify, as shown by FIGS. 22 and 23 (FIG. 23 illustrating in detail the blocks of FIG. 22) the pilot unit AL and the zero resetting generator AP.

Every signal *bp*—supplied by the system $AR_2$ of the "OR" circuits AR every time there is at least one signal *ag* or *ah* (that is to say even in the case of an incomplete information)—instead of being applied to a unit AP of the type illustrated by FIG. 22, is applied to a unit $AP_0$ (FIGS. 22 and 23) also for obtaining two zero resetting signals *av*.

Unit $AP_0$ comprises in series a first shaping subunit BN, a first differentiator BO, a second shaping subunit BP, a second differentiator BQ and a third shaping unit BR (FIG. 22).

More particularly (FIG. 23), sub-unit BN consists of an integrator comprising a transistor 124, a resistor 125, a capacitor 126 and a Schmitt trigger circuit with transistors 127, 128. The length of the signals of the pulse *bp* is increased by about 10 microseconds in the integrator and the elongated signals serve to swing the Schmitt trigger circuit a first time during its beginning and a second time during its end (the trigger circuit is bistable), which produces a rectangular signal *bq*. Due to the fact of the preliminary increase of the length of the signal and of its subsequent shaping, any hole of a duration shorter than 10 microseconds produced by a possible time off-setting of the different binary digits or bits composing signal *bp* has no influence.

The first differentiator BP comprises a capacitor 129 and a register 130 in series and it is followed by a second Schmitt trigger circuit including transistors 131, 132 constituting the second shaping sub-unit. Signal *bq* is differentiated in differentiator BO and the pulse deduced from the edge of the signal corresponding to the resetting of trigger circuit 127, 128 serves to produce in trigger circuit 131, 132 a pilot rectangular pulse *br* of a duration equal to 1 microsecond, which is applied on the one hand to the second differentiator BQ and on the other hand to one of the inputs *bc* of a register BU.

Differentiator BQ, including capacitor 133 and resistor 134, is followed by a third Schmitt trigger circuit including transistors 135 and 136 which gives the desired shape to the pulses. Rectangular pulses shaped after passing through a transistor 119 are delivered by two double emitter-followers 120–121, 122–123 (as in the embodiment of FIG. 21). We thus obtain two resetting to zero signals *av* for every incoming signal *bp*.

As for unit AL, it is replaced in this modification by a unit $AL_0$ comprising a register BT (with transistors 137, 138) which first receives (at its input *bt*) the negative signals or pulses *an* (coming from unit BE, FIG. 13) which it stores up, then (at its input *bu*) the zero resetting signals *av* coming from unit $AP_0$. Thus, after application of zero resetting signal *av*, this register delivers or transfers a pulse to the input *bv* of the "AND" circuit BU (with transistors 139, 140) if it has received a pulse *an*. This "AND" circuit therefore delivers an order pulse *bm* toward unit BM (FIG. 13) only if the energizing of the different resistors is finished (signal *br* produced by signal *bp*) and if register 137, 138 is energized.

Owing to this arrangement, the modification of FIGS. 22 and 23 has the following consequences:

The order for extraction of the information can take place only after the end of the energizing of the registers.

Resetting to zero can occur only after the order of extraction.

The information is extracted and resetting to zero effected as soon as the registers have been filled up, which makes piloting of the reading independent of the speed at which the magnetic tape in unwound and permits high densities of information.

In addition to this modification of units AL and AP into units $AL_0$ and $AP_0$ as illustrated by FIGS. 22 and 23, we might provide a supplementary modification of the whole of the reading system illustrated by FIG. 13. This supplementary modification would consist in cancelling registers AE and AF and in giving units BE and BF a time constant equal to that of integrator circuit 124, 125, 126 (10 microseconds), these units BE and BF then playing the part of registers. The state of every register unit BE, BF is examined by an "OR" circuit and the fifteen outputs of this "OR" circuits energize an "AND" circuit (or a group of "AND" circuits) as in the embodiment of FIG. 13. The output of this "AND" circuit supplies the order of extraction from the registers after a small delay if the sign of the reference channel corresponds to the portion of the information that is valid. This modification permits of dispensing with the bistable devices AE, AF and with the circuits necessary for resetting them to zero without diminishing the advantages of the device according to the invention, provided however that the means for driving the magnetic tape ensure a sufficiently stable speed of unwinding so that the maximum time interval between two bits of an information is shorter than the time defined by the above stated time constant (10 microseconds) for the different possible driving speeds. As for the control of the informations, it is always carried out by a system of "OR" circuits with sixteen inputs connected with the outputs of units BE and BF.

The device according to the present invention has, among many advantages, the following ones:

First, it permits a recording of informations without altering the time relation between them.

Recording is effected in such manner as to prevent confusion between the absence of recording and the recording of a given digit.

Recording is particularly little sensitive to parasitic signals.

Reading is carried out with a maximum safety, any incorrect information being cancelled.

It is possible easily to determine the percentage of erroneous informations.

It is possible directly to control the recording by the reading system without passing through the actual reading step, which is very advantageous when recording takes place at very slow speeds.

The whole of the device can easily be made in the form of printed circuits with semi-conductors (transistors and solid diodes), resistors and capacitors.

In a general manner, while we have in the above description disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A device for recording information on a magnetic support and for reading the information thus recorded, said recording being effected in pure binary code, which device comprises, in combination:

recording means comprising, on the one hand, for each binary order individually, a register unit having an input receiving the successive bits of the corresponding order and two outputs supplying opposed signals, one of which represents the received bit and the other of which represents the negation of this bit, an "exclusive OR" unit comprising two "AND" sub-units and an "inclusive OR" sub-unit, each said sub-unit having two inputs and an output, said two "AND" sub-units being mounted in parallel and having their outputs each connected to one of the inputs of said "inclusive OR" sub-unit, the output of said "inclusive OR" sub-unit forming the output of said "exclusive OR" unit, a first current generator started by the output of the "exclusive OR" unit, and a phase modulation information bit recording head, excited by the output of said first generator, and, on the other hand, for all the binary orders collectively, a zero resetting pulse generator connected with every register unit for periodically resetting it to zero with a recurrence period equal to that of the information received, a pilot unit, started by said zero resetting pulses, for delivering a pair of opposed signals with the same recurrence period but with a delay, shorter than the duration of this period, with respect to the zero resetting pulses, the first signal of every pair of signals delivered by the pilot unit being fed to one of the two inputs of one of the "AND" sub-units of all the "exclusive OR" units, the other input of this sub-unit being fed by the second signal from the register unit of the same binary order, whereas the second signal of every pair of signals delivered by the pilot unit feeds one of the two inputs of the other "AND" sub-unit of all the "exclusive OR" units, the other input of these other "AND" units being fed by the first signal of the register unit of the same order, a second current generator started by one of the two output signals of the pilot unit, and a phase modulation information bit recording head energized by the output of said second generator, and reading means comprising, on the one hand for each binary order individually, a phase modulation recorded information bit reading head, a first shaping unit having an input connected to said information bit reading head and adapted to produce shaped negative and positive pulses, a register unit connected to said first shaping unit for receiving said shaped pulses and for delivering a usable bit pulse for the corresponding binary order, and, on the other hand, for all the binary orders collectively, a phase modulation recorded reference bit reading head, a second shaping unit having an input connected to said reference bit reading head for shaping the read reference bits, said reference bit reading head and said second shaping unit being analogous to the corresponding information bit reading head and first shaping unit, a pilot unit connected to every register unit of said reading means for synchronizing the output of the information bits that have been read, and a generator connected to every register unit of said reading means for resetting these register units to zero after delivery of the bits of all the binary orders.

2. A device according to claim 1 in which said first shaping unit is controlled by the bit that has been read in the corresponding binary order.

3. A device according to claim 1 in which said first shaping unit is controlled by a recording check pulse fed into an input of said first shaping unit.

4. A device according to claim 1 in which each said register unit of said reading means comprises a first register having an input and an output, said first register receiving on its input the negative pulses from said first shaping unit, a second register having an input and an output, said second register receiving on its input the positive pulses from said first shaping unit, a mixing "inclusive OR" circuit having inputs connected with the respective outputs of said first and second registers, an "AND" circuit having an input and an output, said input being connected with the output of said first register, and a reversing circuit connected to the output of said "AND" circuit, said reversing circuit being adapted to reverse the output signal of said "AND" circuit to deliver the usable bit pulse for the corresponding binary order.

5. A device according to claim 4 in which, in said reading means, said pilot unit of said reading means comprises a delay circuit for applying a first delay, smaller than one half of the duration of the period of recurrence of the informations read, to the negative pulses produced in said second shaping unit, and "AND" circuit having a plurality of inputs and an output one input of which is connected with the output of said pilot unit of said reading means and each of the other inputs of which is connected with the output of the "inclusive OR" circuit of the register unit of a binary order, and the output of which delivers a control pulse applied to another input of the "AND" circuit of all the register units, said generator for resetting to zero the register units being controlled by an "inclusive OR" unit fed with the shaped pulses delivered by every said first shaping unit, said generator comprising a delay unit introducing a second delay of the order of one half of the period of recurrence of the informations that are read and means for reversing the output of the delay unit and applying the reversed pulse to the other input of the two registers of every register unit for resetting them to zero.

6. A device according to claim 4 in which, in said reading means, said zero resetting generator of said reading means comprises in series a first shaping sub-unit, receiving one input signal for every information that it reads, whether complete or incomplete, a first differentiating circuit, a second shaping sub-unit for delivering a signal delayed with respect to said input signal, a second differentiating circuit and a third shaping sub-unit for delivering zero resetting signals, said pilot unit comprising a register having two inputs and an output, one of said inputs receiving said negative pulses from said second shaping unit, and the other of said inputs receiving, for resetting its register to zero, the delayed signals from the second shaping sub-unit, and an "AND" circuit having two inputs and an output, one of said inputs receiving the output from said register of said pilot unit and the other of said inputs receiving the zero resetting signals delivered by the third shaping sub-unit.

References Cited

UNITED STATES PATENTS

| | | | |
|---|---|---|---|
| 3,281,804 | 10/1966 | Dirks | 340—174.1 |
| 3,264,623 | 8/1966 | Gabor | 340—174.1 |
| 2,813,259 | 11/1957 | Burkhart | 340—174.1 |

BERNARD KONICK, *Primary Examiner.*

A. I. NEUSTADT, *Assistant Examiner.*